Oct. 11, 1932.                F. J. LAPOINTE                1,881,705
                                 BROACH
                          Filed April 2, 1930
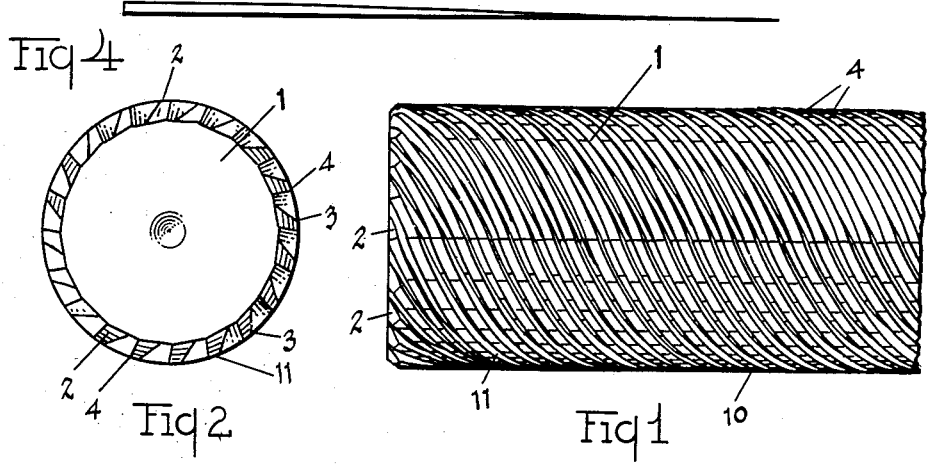
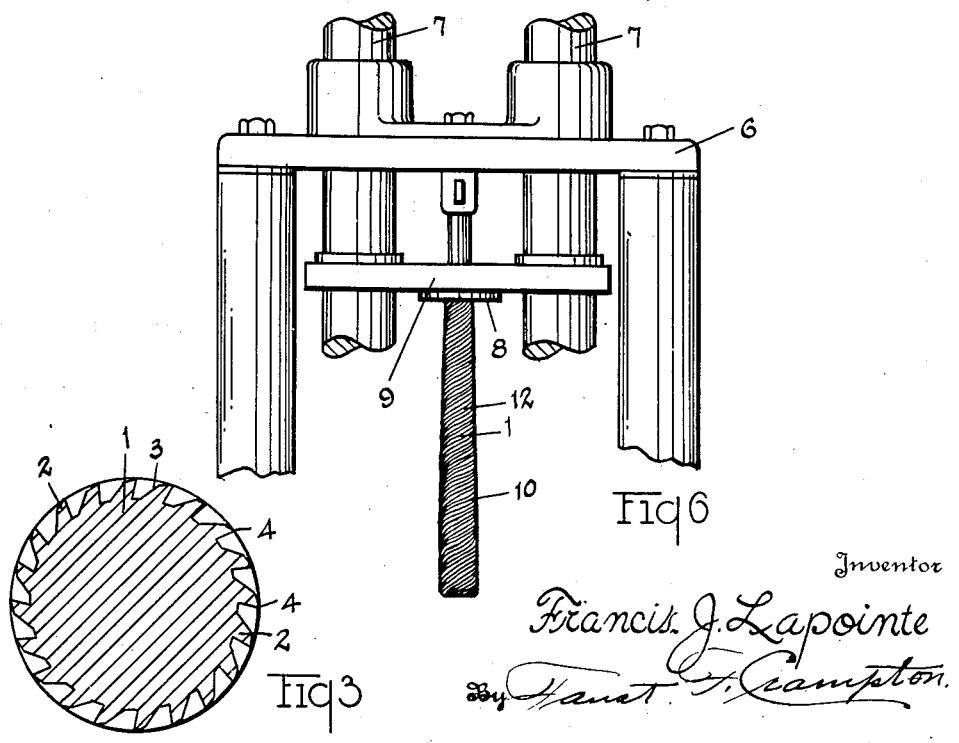

Patented Oct. 11, 1932

1,881,705

UNITED STATES PATENT OFFICE

FRANCIS J. LAPOINTE, OF ANN ARBOR, MICHIGAN

BROACH

Application filed April 2, 1930. Serial No. 441,106.

My invention has for its object to provide an exceedingly efficient broach that is formed to produce a constant cutting resistance throughout the entire broaching operation and thereby eliminate the chattering or jarring caused by the teeth entering and leaving, in succession, the work, as is done in connection with broaches used heretofore in the art.

The broach embodying my invention may be made in the form of a pull broach or a push broach. In either case it is so constructed as to produce a constant load or operating pressure on the broach and on the work, and each tooth producing a continuous shear that ordinarily progresses spirally from the surface of the hole in the work being broached. The broach is provided with a large number of spirulated teeth forming flutes that are placed in close proximity to each other and conforming to a spiral convolute, since the diameter of the broach increases uniformly from one end of the broach to near the other end, having a cylindrical end portion and of the size of the finished hole. Thus, the differential in the diameter between adjoining teeth is very small. The cutting teeth that form the spiral fluted broach are formed to have a considerable rake and are located, preferably, about $\frac{3}{16}$ of an inch apart. The larger diameter of the broach the greater the number of spiral teeth are used. Thus, on a broach ¾ of an inch in diameter, eight or ten flutes are used, while in a broach of 2 inches in diameter, sixteen to twenty flutes are used. The cutting edges produce a uniform shearing action and provide for a uniform pressure throughout the entire length of the hole that is being enlarged and as measured in the direction of the movement of the broach and also as measured circumferentially.

The spirulated teeth are formed to have an angle with a plane at right angles to the axis of the broach of from one to one, of the base compared to the height, to a ratio of one to three, depending on the size of the hole to be cut. The angle of the teeth to the plane at right angles to the axis is such that the pressure required to cut the surface of the metal is sufficient to hold the work from turning on the work plate and the broach from turning in the head of the broaching machine.

The invention may be contained in broaches that vary in the details of their construction. To illustrate a practical application of the invention, I have selected a pull broach embodying the invention as an example of the broaches that contain the invention, and shall describe the broach selected hereinafter. The broach referred to is shown in the accompanying drawing.

Fig. 1 is a side view of the end of a part of the pull broach. Fig. 2 is an end view of the broach shown in Fig. 1. Fig. 3 illustrates a cross section of the broach taken on a plane at right angles to the tapered portion of the broach. Fig. 4 illustrates diagrammatically the shape of the land of a flute developed on a plane. Fig. 5 illustrates a shaving that is cut by the broach from an opening through the work about 1 inch in thickness. Fig. 6 illustrates a broach secured in position in a broaching machine.

The broach 1, of the drawings, is provided with 18 or 20 teeth 2, that are ranged spirally and so as to be located in close parallel arrangement covering the area of the slightly tapered surface of the broach. The teeth have a considerable rake, as at 3, and the cutting edges 4 shear the metal of the work continuously. On account of the close proximity of the teeth and their continuity throughout the entire length of the broach, the metal is progressively sheared to form very thin shavings that are progressively extended spirally from the surface of the work, such as the one shown in Fig. 5, which is an illustration in full size, of a shaving removed from the two inch broach, part of which is shown in Fig. 1, the parts of the broach also being shown in full size. The curled shavings produced by the broach are 4 or 5 inches in length and when straightened out would probably reach 7 or 9 inches in length. Each cutting edge progressively develops its own shaving which curls within the channels formed by the flutes. The metal removed by each tooth is progressively picked up as each tooth enters the work to form a very thin shaving that may progressively increase in width as it is forced to spirulate within the space between the contiguous flutes. They form upwardly above the work as the broach descends. They appear to grow as their length increases from between the spirals. In the operation there is thus produced a uniform resistance throughout the entire area of the surface of the opening measured both in the direction of the movement of the broach and circumferentially, which operates to hold the work as against any chattering or vibration due to consecutive teeth on entering and leaving the broach. Furthermore, if the metal varies in its density, or hardness, there will be the uniform shearing action of the cutting edges through the metal notwithstanding such variation.

The holes produced by the use of the fluted broach of the character described are of uniform diameter and the surfaces formed are true in their cylindricity, while in the broaches having teeth located farther apart than the teeth of the broach described, or teeth that are wanting in continuity, the work shifts latterly to form "snake" or sinuous holes.

Owing to the formation of exceedingly thin shavings by the shearing action of the teeth, which arises from the fact that adjoining teeth are placed in close proximity to each other, and the diametric differential is very minute, the rotative pressure exerted on the work and the reaction of such pressure on the tool will be practically nil. Also, owing to the exceedingly thin shaving that each tooth progressively forms, the spaces between the teeth readily care for the shavings formed by each tooth.

Thus, the broach may be secured to the cross head 6 that is guided by suitable posts, such as the posts 7, to force the broach 1 through the work 8 that is placed against a fixed plate, or work supporting table, 9, on which, or in which, the work may be readily secured.

The body of the broach is tapered at 12, leaving an end portion 10, cylindrical in form, and the flutes extend from one end of the broach to the outer end of the cylindrical portion of the broach. The flutes are formed to have a land that is located in the cone of the tapered portion and the cylinder of the finishing end of the broach. When, therefore, the cutting edges are formed, that is, when they are given the rake and the shearing edge is produced, the broach is placed on the centers to locate the tapered portion parallel to the movement of the grinding wheel and, as the grinding or edge-producing tool reaches the full diameter of the cylindrical portion of the broach, it gradually recedes from this portion of the broach, increasing the land at this point until it leaves the land 11 at its full width. When, therefore, the broach becomes dull and is reground, the teeth are carried back a minute distance farther into the portion of the broach having the full diameter, namely, the cylindrical portion, and the narrower width of the land is carried back the same distance. There always remains a full width of the land on the finishing end of the broach, which has the full size of the hole that is to be formed by the broach. Thus, the spirulated flutes permit regrinding of their edges and yet the broach always remains the same size, and the relation of the edges remain constant, notwithstanding the repeated resharpening that may be done.

The grinding of the broach to sharpen the teeth forms in the cylindrical part of the broach an increasing width of land until the full width of the land is reached in connection with each flute. Thus, there is formed an exceedingly thin or narrow area that progresses from the sharp edges of the flute to the full width of the land of the flutes. The narrower portions of the lands of the cylindrical part of the broach first operate upon the surface that has been cut by the sharpened edges of the flutes and operate more efficiently to smooth the surfaces of the work that have just previously been formed by the cutting edges of the broach. The fine or narrower portions of the lands of the spirulated flutes are then followed by the broader portions of the lands to burnish the surface of the broach and leave the hole at the full diameter of the broach. Consequently, the broach embodying my invention remains of constant size, notwithstanding practically any number of resharpenings, and furthermore, the lands of the spirulated flutes thoroughly burnish the surface of the work and are so formed as to surface harden the work. By my invention, I maintain three times the cutting edge length that is obtained in a broach having circular cutting edges and can at the same time remove substantially the same amount of metal with substantially the same pressure.

I claim:

1. A broach having a tapered portion and having spirulated flutes, the flutes having cutting edges, the cutting edges extending from one end of the tapered portion of the broach to near the other end of the tapered portion and terminating at said other end of the tapered portion of the broach in lands that gradually increase in width to produce a constant cutting resistance in all points of the surface of the hole in the work being enlarged by the broach.

2. A broach having tapered and cylindrical portions and having spirulated flutes, the flutes having cutting edges, the cutting edges extending from one end of the tapered portion of the broach to near the other end of the tapered portion and terminating at said other end of the tapered portion of the broach in lands that increase in width, the wider portions of the said lands terminating at one end of the cylindrical portion, the lands of the flutes continuing over the length of the cylindrical portion to produce a burnishing of the surface of the work when the cylindrical portion passes through the work.

3. A broach having tapered and cylindrical portions and having spirulated flutes extending throughout the length of the said portions, the flutes of the tapered portion of the broach having cutting edges, the cutting edges extending in continuous lines from one end of the tapered portion of the broach to near the other end of the tapered portion of the broach and inclined at an angle of from 45° to 72° to a plane extending at right angles to the axis of the broach, the cutting edges formed in the tapered portion of the broach having narrow lands of increasing width in the direction from the tapered portion to the cylindrical portion, the lands reaching their maximum width in the cylindrical portion and the width of the lands continuing throughout the length of the cylindrical portion.

4. A broach having a tapered portion, a plurality of spirulated flutes having cutting edges located in the tapered portion of the broach, the cutting edges extending from one end of the broach to near the other end of the tapered portion of the broach to produce a constant cutting resistance in all points of the surface of the hole in the work being enlarged by the broach, the broach having a cylindrical end portion adjacent the larger end of the tapered portion and the flutes in said tapered portion and cylindrical portion having a land increasing in width in the direction from the tapered portion to the cylindrical portion.

5. A broach having a tapered portion and a cylindrical portion, a plurality of spirulated flutes, the flutes having cutting edges in the tapered portion of the broach, the cutting edges extending from one end of the broach to near the larger end of the tapered portion of the broach and inclined at an angle to a plane extending at right angles to the axis of the broach from 45° to 72° to produce a pressure on the work sufficient to hold the work from rotation upon axial movement of the broach and without rotation of the broach, the cutting edges terminating in narrow lands increasing in width in a direction from the tapered portion to the cylindrical portion, the lands having a maximum width in the cylindrical portion of the broach.

In witness whereof I have hereunto signed my name to this specification.

FRANCIS J. LAPOINTE.